(No Model.) 3 Sheets—Sheet 1.

W. CORCORAN.
ROCK PULVERIZER.

No. 303,125. Patented Aug. 5, 1884.

Witnesses;
Geo. H. Strong.

Inventor,
Wm Corcoran
Dewey & Co.
Attorneys (No Model.)  3 Sheets—Sheet 2.

W. CORCORAN.
ROCK PULVERIZER.

No. 303,125.  Patented Aug. 5, 1884.

Witnesses,
Geo. H. Strong
G. H. Rouse

Inventor,
Wm Corcoran
By Dewey & Co.
Attorneys

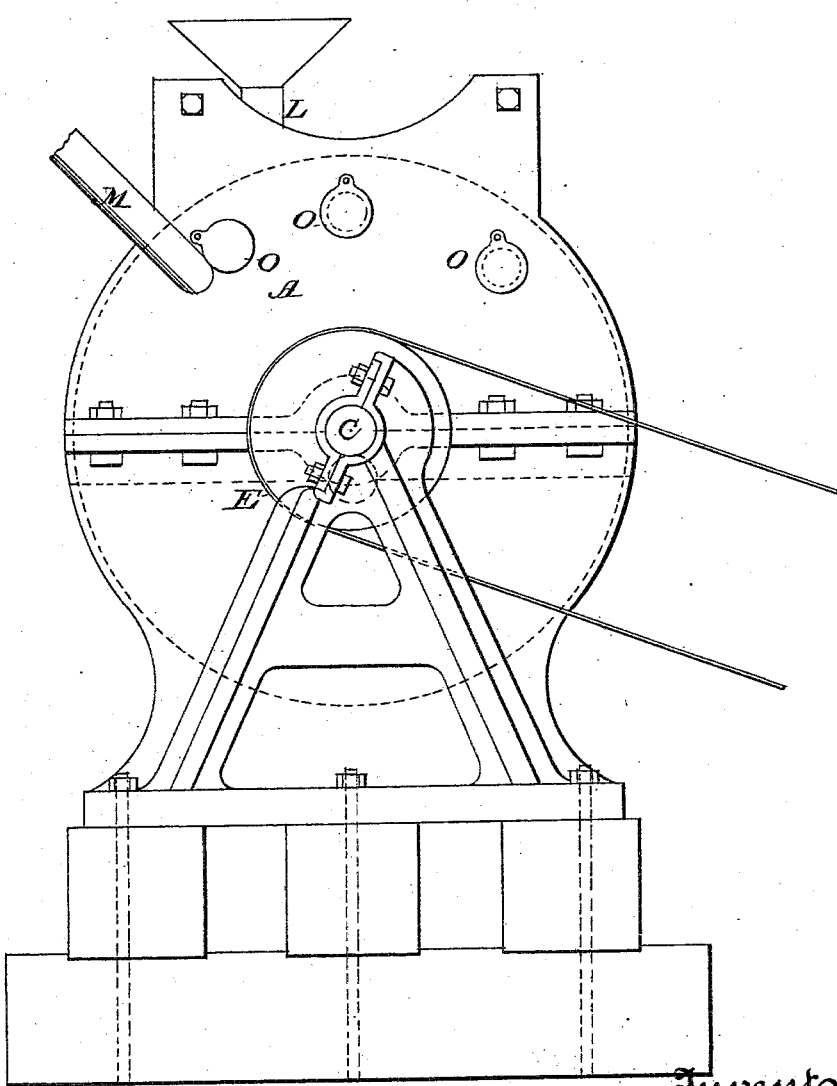

UNITED STATES PATENT OFFICE.

WILLIAM CORCORAN, OF SAN FRANCISCO, CALIFORNIA.

ROCK-PULVERIZER.

SPECIFICATION forming part of Letters Patent No. 303,125, dated August 5, 1884.

Application filed December 28, 1883. (No model.)

*To all whom it may concern:*

Be it known that I, WILLIAM CORCORAN, of the city and county of San Francisco, and State of California, have invented Improvements in Rock-Pulverizers; and I hereby declare the following to be a full, clear, and exact description thereof.

My invention relates to mechanism for crushing or pulverizing rock, and especially such as contains valuable metals; and it consists in certain details of construction, all of which will be more fully described, claimed, and explained by reference to the accompanying drawings, in which—

Figure 1:
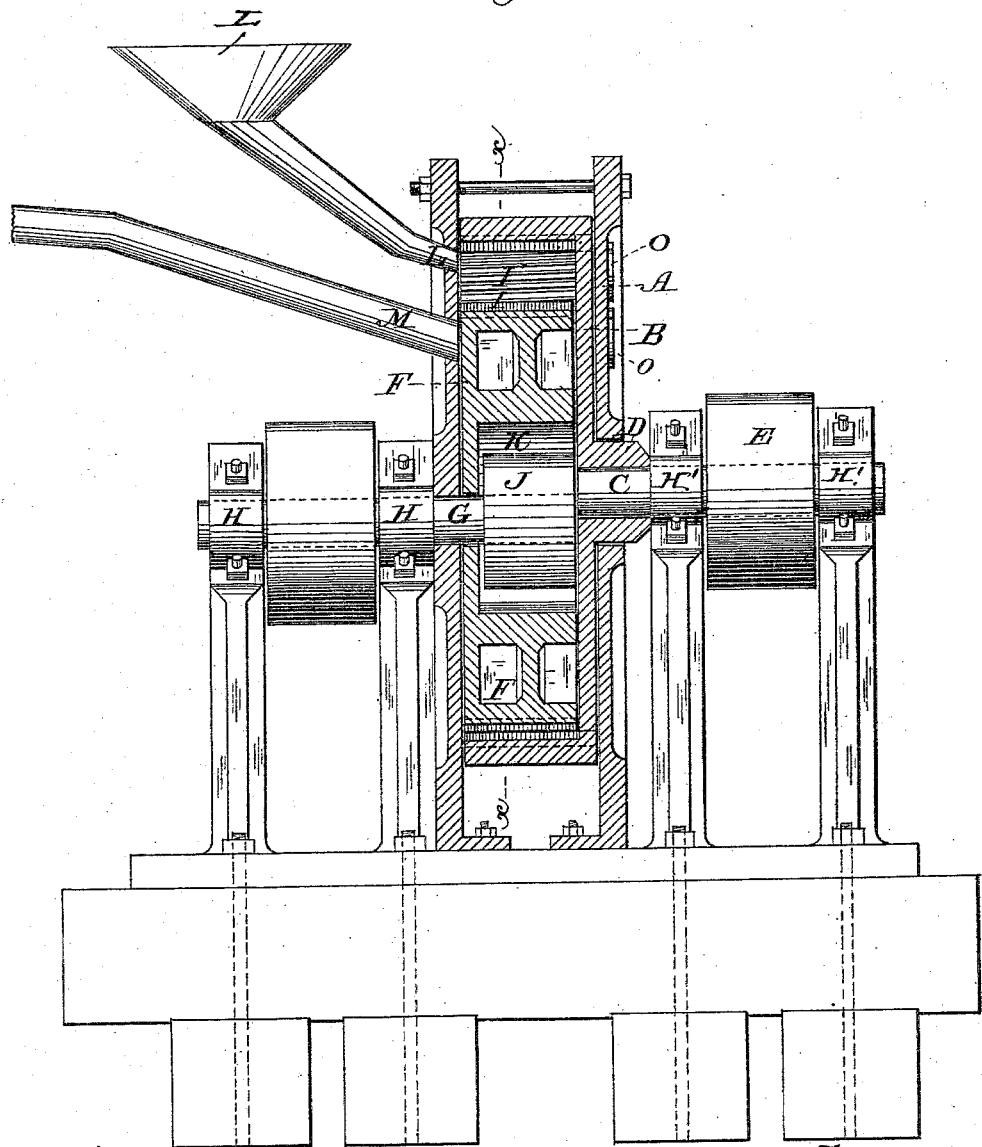
Figure 2:
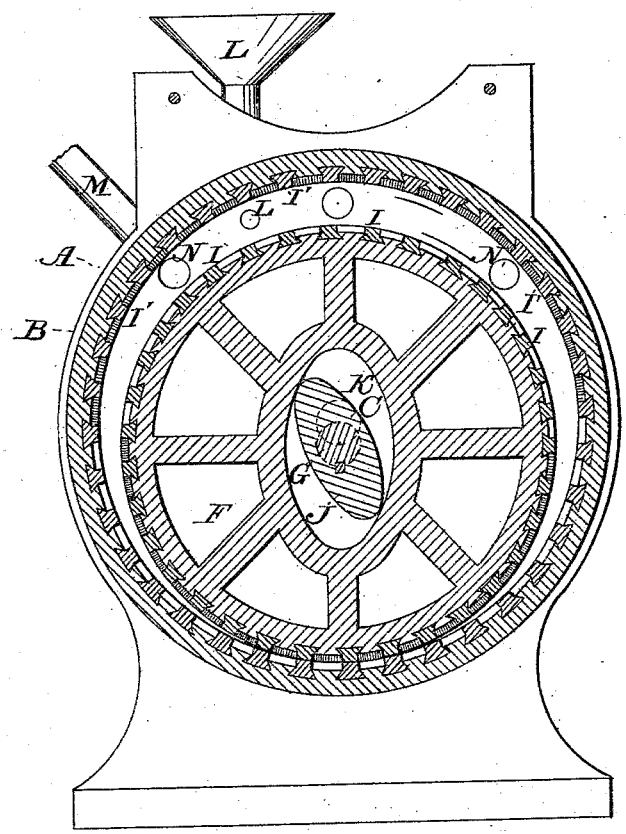
Figure 3:
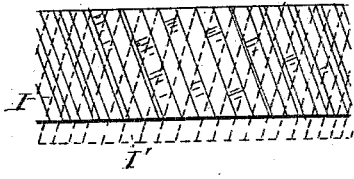
Figure 4:
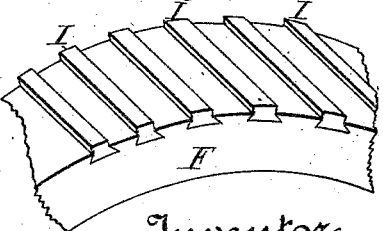

Figure 1 is a vertical section taken through the plane of the axes of the cylinders. Fig. 2 is a central vertical section transverse to the axes of the cylinders. Fig. 3 is an exterior view of a portion of the outer cylinder, showing the diagonal shoes and the shoes of the inner cylinder in dotted lines. Fig. 4 is a perspective view of a segment of the inner cylinder, showing the shoes and manner of attaching them. Fig. 5 is an end elevation of the outer case.

A is an exterior case, within which the exterior hollow cylinder or drum B rotates, the drum being supported upon a shaft, C, which projects out through the side of the case, and is supported in suitable journal-boxes, H' H'. The hub D of this cylinder is of sufficient length to support the cylinder firmly upon the shaft, and a pulley or gear-wheel, E, may be fixed to the shaft for the application of power to rotate it. The cylinder F is smaller than the cylinder B, so that it may lie inside the latter, and so low that its outer periphery comes in close proximity with the inner periphery of the outer cylinder at the lowest point. The shaft G of this cylinder is journaled in boxes H upon the opposite side from the shaft C and lower down, and supports the cylinder F inside the cylinder B. The inner cylinder has bars I driven diagonally across its face in dovetailed slots by which they are firmly held, so that their outer faces project above the face of the cylinder. The inner surface of the outer cylinder has similar bars, I', driven into dovetailed slots made diagonally across it, and in the opposite direction from the angle of the bars I, as shown in Fig. 3, so that when the two are caused to rotate in opposite directions there will be a shear-like action between these bars or shoes.

In order that the shaft G of the inner cylinder may drive it, and at the same time allow the cylinder to adjust itself to the varying quantities of rock which may be beneath it, an oval hub, J, is keyed to the end of the shaft, so as to fit loosely within a larger oval opening, K, in the center of the cylinder. When the shaft is turned, the hub presses against the sides of the opening, and thus drives the cylinder, as shown in Fig. 2. The rock is fed into the case through a hopper or opening, L, and falls between the two cylinders; which, rotating in opposite directions, soon pulverize it to a sufficient fineness, and it is carried up and discharged through a pipe, M, through the action of a suction-fan which is connected with it, but not here shown. Two or more openings, N, may be made to either of which the discharge-pipe M may be connected at will, those not in use being closed by disks or plates O. Whenever the diagonal bars or shoes become worn and it is necessary to remove or replace them, the cover of the case A is loosened and raised up. The cylinders may be removed and the bars or shoes driven out from opposite sides without difficulty. As these bars receive most of the wear it is only necessary to replace them as they become worn down to keep the machine in working order. The peculiar movement of these oppositely-moving diagonally-placed bars or shoes is to produce a shearing action upon material passing between them, and it is thus very rapidly reduced. Whenever these bars or shoes become worn upon one edge, the machine is run in the opposite direction, the position of the discharge-pipe being changed to correspond, and the opposite edges of the bars will then receive the wear. By reason of the oval opening in the inner drum and the loosely-fitting oval hub by which it is driven, the drum is allowed to settle and adjust itself to the wear as fast as it takes place.

Having thus described my invention, what I claim as new, and desire to secure by Letters Patent, is—

1. The combination, in a pulverizer, of an exterior and an interior cylinder mounted upon independent horizontal shafts and adapted to move with their lower adjacent faces in opposite directions and in contact, said cylinders being provided with diagonal bars or shoes fixed upon their faces, and arranged to cross each other at opposite inclines, substantially as herein described.

2. The combination, in a pulverizer, of an exterior cylinder, a shaft, and means for driving it in one direction with an interior cylinder having an oval central opening, a shaft having an oval hub fixed upon its end to enter the oval opening, and means to drive the interior cylinder in the opposite direction from the outer one, the axis of said shaft and inner cylinder being lower than the axis of the outer cylinder and shaft, substantially as herein described.

3. The combination, in a pulverizer, of an outer cylinder, a shaft, and means for rotating it, said cylinder having bars or shoes secured diagonally across its inner face, with a smaller interior cylinder, a shaft journaled below the outer cylinder-shaft, and connected loosely with the cylinder, said cylinder having bars or shoes secured diagonally across its outer face at an opposite incline from the bars of the outer cylinder, substantially as herein set forth.

4. The combination of the cylinders B and F, having dovetailed slots extending diagonally across their adjacent faces, and the bars or shoes I I', having their rear sides fitted to be driven into the slots, and their front sides projecting beyond the faces of the cylinders, substantially as herein set forth.

5. The combination of cylinders B and F, and means for rotating them in opposite directions with relation to each other, as shown, said cylinders having oppositely-inclined diagonal bars upon their meeting faces, said bars being fitted into dovetailed slots, and removable, substantially as herein described.

In witness whereof I have hereunto set my hand.

WILLIAM CORCORAN.

Witnesses:
S. H. NOURSE,
H. C. LEE.